United States Patent
Hoyland

(10) Patent No.: US 8,307,628 B2
(45) Date of Patent: Nov. 13, 2012

(54) REAR FAN CASE FOR A GAS TURBINE ENGINE

(75) Inventor: Matthew A. C. Hoyland, Chesterfield (GB)

(73) Assignee: Rolls-Royce PLC, London (GB)

( * ) Notice: Subject to any disclaimer, the term of this patent is extended or adjusted under 35 U.S.C. 154(b) by 844 days.

(21) Appl. No.: 12/385,055

(22) Filed: Mar. 30, 2009

(65) Prior Publication Data
US 2009/0260344 A1    Oct. 22, 2009

(30) Foreign Application Priority Data

Apr. 21, 2008 (GB) .................................. 0807137.5

(51) Int. Cl.
*F02K 3/02* (2006.01)
(52) U.S. Cl. .............. 60/226.2; 244/110 B; 239/265.25; 60/226.13; 60/226.3
(58) Field of Classification Search .................... 60/796, 60/798, 226.2, 770, 226.3, 230; 244/53 B, 244/110 B, 54; 137/15.1, 15.2; 248/554; 239/265.25
See application file for complete search history.

(56) References Cited

U.S. PATENT DOCUMENTS

| 3,061,349 | A | * | 10/1962 | Dellith | 292/304 |
| 5,046,307 | A | * | 9/1991 | Matta et al. | 60/226.2 |
| 5,362,204 | A | * | 11/1994 | Matyscak et al. | 415/213.1 |
| 5,967,460 | A | * | 10/1999 | Baudu et al. | 244/110 B |
| 6,032,901 | A |   | 3/2000 | Carimali et al. | |
| 6,076,347 | A | * | 6/2000 | Gonidec et al. | 60/226.2 |
| 7,563,069 | B2 | * | 7/2009 | Harper | 415/9 |
| 7,871,486 | B2 | * | 1/2011 | Xie et al. | 156/242 |
| 8,038,393 | B2 | * | 10/2011 | Audeon et al. | 415/214.1 |
| 2008/0116334 | A1 | * | 5/2008 | Xie et al. | 248/205.1 |
| 2008/0116335 | A1 | * | 5/2008 | Xie et al. | 248/205.1 |
| 2008/0118683 | A1 | * | 5/2008 | Xie | 428/34.5 |
| 2009/0123280 | A1 | * | 5/2009 | Audeon et al. | 415/214.1 |

FOREIGN PATENT DOCUMENTS

EP    1 927 732 A2    6/2008

\* cited by examiner

*Primary Examiner* — William H Rodriguez
(74) *Attorney, Agent, or Firm* — Oliff & Berridge, PLC

(57) ABSTRACT

A rear fan case for a gas turbine engine includes a main body and a discrete joining arrangement mounted on the outside of the main body towards its rear end. The joining arrangement provides a substantially radial groove around the main body, which can receive a joining blade on a thrust reverser unit to form a joint between the rear fan case and the thrust reverser unit. The joining arrangement may be made of metal while the main body is made of composite material. Features may be provided to ensure proper alignment and location of the joining arrangement.

12 Claims, 5 Drawing Sheets

Prior Art

REAR FAN CASE FOR A GAS TURBINE ENGINE

This invention concerns a rear fan case for a gas turbine engine, and also a gas turbine engine including such a rear fan case.

On many gas turbine engines usable for instance on aircraft, thrust reverser units are mounted to the rear of the rear fan case. A joint between these components in the form of a V-Blade on the reverse thrust unit engaging in a V-Groove around the outside of the fan case is generally used in preference to a bolted flange, to provide easier access to the core engine for maintenance.

The thrust reverser is generally split into left and right hand halves supported on hinges at a pylon on the engine. The two halves are normally latched together in use at the bottom. To access the engine for maintenance, the latches are undone and the halves of the thrust reverser are swung upwards. The V-Blade on each half of the thrust reverse unit swings away from the groove around the casing. On closing of the thrust reverser, the blades return back into the groove providing a required structural joint.

Due to the pylon at the top and the bifurcation disconnect panel at the bottom, the thrust reverser unit does not have a V-Blade in these locations. This usually means that more complex seals are required at these locations, with the seal having to interface with the V-Groove on the casing.

According to the present invention there is provided a rear fan case for a gas turbine engine, the case including a main body and a discrete joining arrangement mounted on the outside of the main body towards a rear end thereof, the joining arrangement providing a substantially radial groove around the main body, which groove can receive a joining blade on a thrust reverser unit to form a joint between the rear fan case and the thrust reverser unit.

The joining arrangement may be configured such that the groove does not extend wholly continuously around the body.

The joining arrangement may be configured such that the groove does not extend around an upper part of the body, and a gap may be provided in the groove at an upper part of the body extending for between 15° and 25°.

The joining arrangement may be configured such that the groove does not extend over a lower part of the body, and a gap may be provided in the groove at a lower part of the body extending for between 5° and 15°.

The joining arrangement may be formed of two or more discrete sections. Mounting formations may be provided on some or all of the sections of the jointing arrangement, with mounting formations alignable with corresponding formations on the main body.

Further mounting formations may be provided on some or all of the sections of the jointing arrangement, the further mounting formations being alignable with corresponding formations on additional components, to ensure correct mounting of the jointing arrangement.

The body may be made of a composite material, and may be made of a carbon composite. The joint arrangement may be made of metal.

The invention also provides a gas turbine engine, the engine including a rear fan case according to any of the preceding seven paragraphs.

Embodiments of the present invention will now be described and with reference to the accompanying drawings, in which:—

Figure 1:
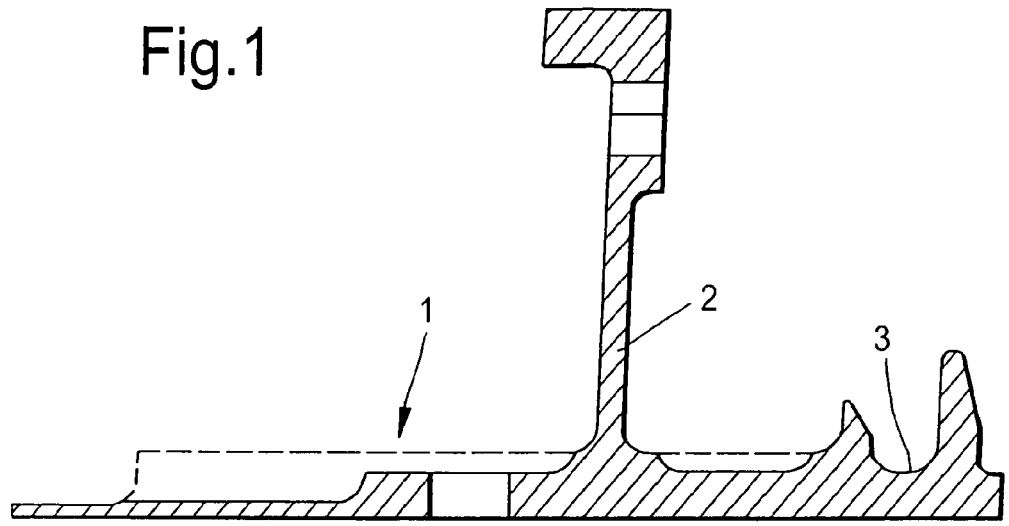
FIG. 1 is a diagrammatic cross sectional side view of part of an existing rear fan casing.
Figure 2:
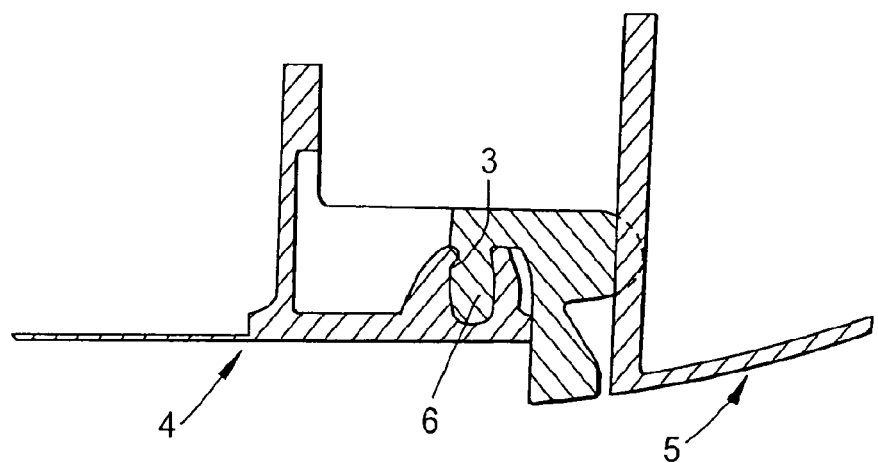
FIG. 2 is a diagrammatic cross sectional side view showing a joint between an existing rear fan casing and a thrust reverse unit.

FIG. 1 shows a conventional rear fan casing 1 of a gas turbine engine. The casing is made of metal, and may be made of titanium. The casing 1 is in the form of a profiled annular ring, which has an outwardly extending stiffening flange 2. Towards the rear edge of the casing 1, a radially open groove 3 is provided. FIG. 2 shows part of a similar rear fan casing 4 with a thrust reverser unit 5 joined thereto. A V-Blade 6 is provided on the unit 5, which blade 6 locates in the groove 3.

As described above, the unit 5 is split in to left and right hand halves, which are hinged together at an upper pylon, and can be latched together at the bottom. The two halves can be opened up moving the blade 6 out of the groove 3, to permit maintenance to the core engine.

Figure 3:
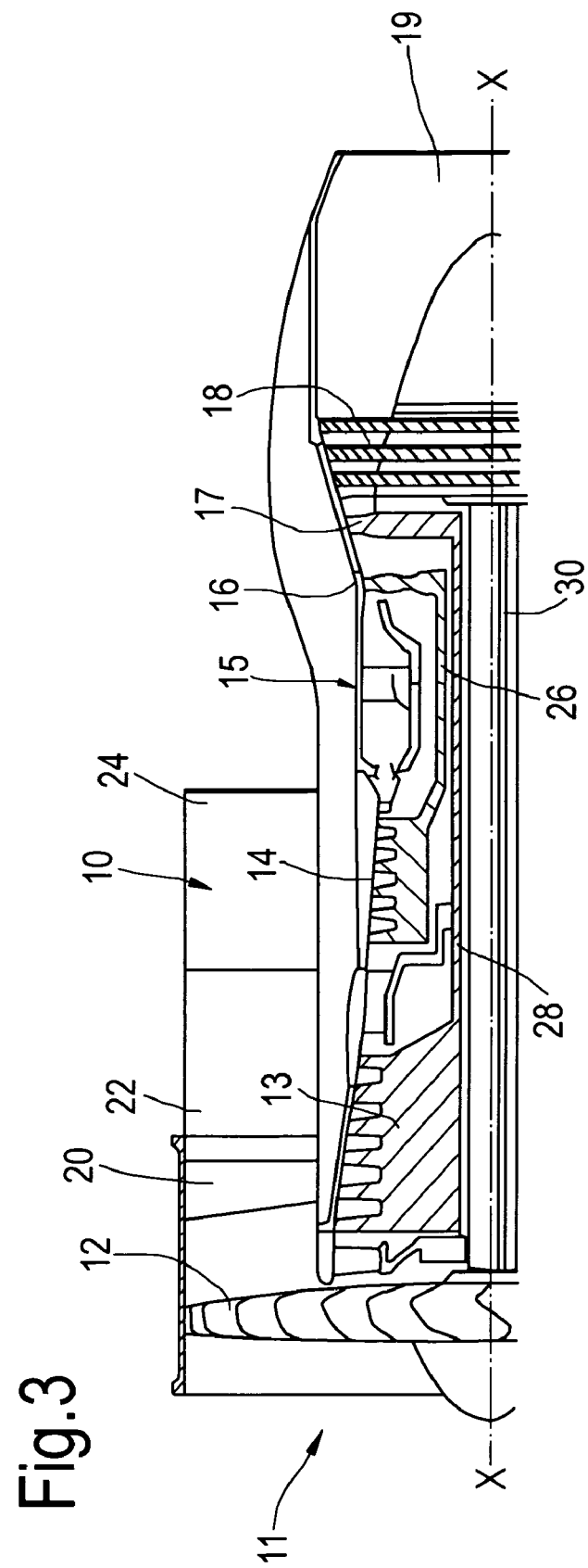
FIG. 3 is a diagrammatic cross sectional view of part of a gas turbine engine according to the invention.
Figure 4:
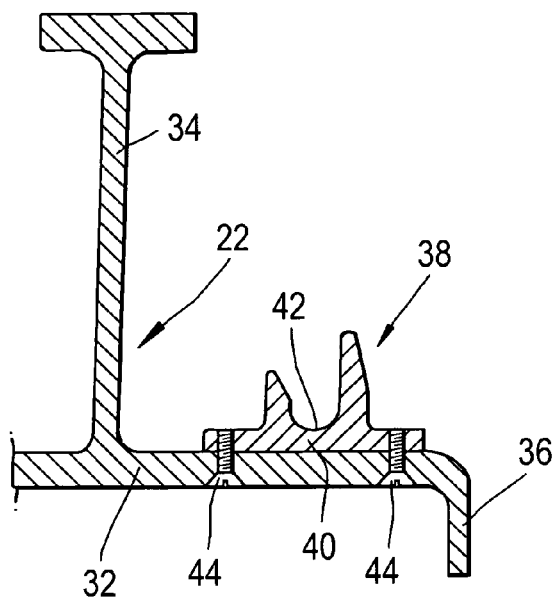
FIG. 4 is a diagrammatic cross sectional side view of part of a first rear fan case according to the invention.
Figure 5:
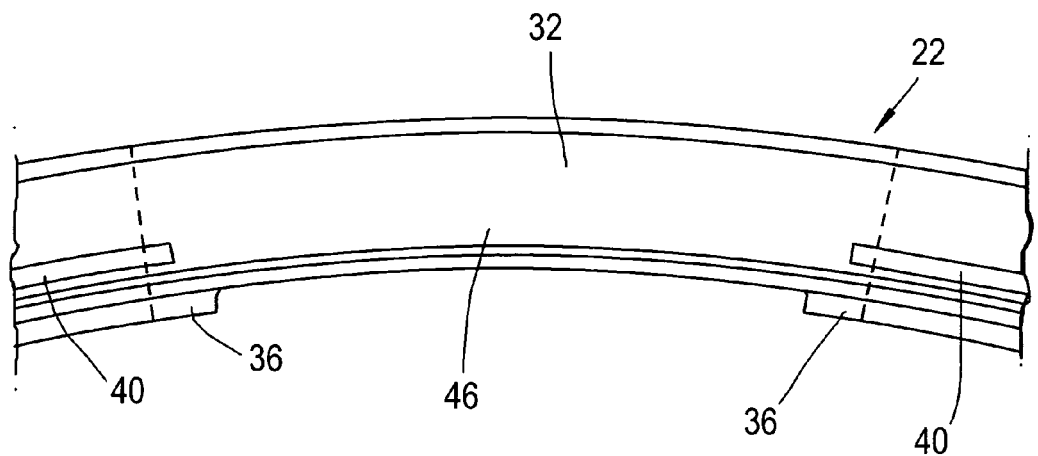
FIGS. 5 and 6 are diagrammatic end views of part of the rear fan case of FIG. 4 at respectively top and bottom parts of the case.
Figure 6:
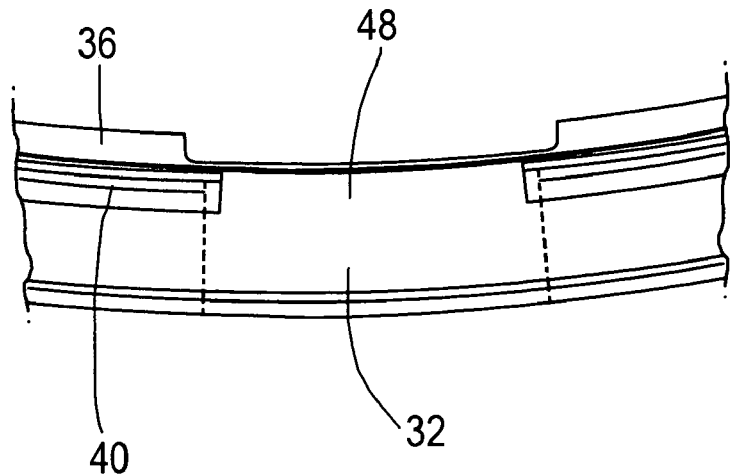

Referring to FIG. 3, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

The fan 12 is located in a front fan case 20. A rear fan case 22 extends behind the front fan case 20, and a reverser thrust unit 24 extends behind the rear fan case 22.

FIGS. 4 to 7 show part of the rear fan case 22, according to the invention, in more detail. The fan case 22 comprises an essentially cylindrical body 32 with a stiffening ring 34 similar to ring 2 on the rear fan case 1. The rear fan case 22 is however made of a carbon composite material. An inwardly turned flange 36 is provided around part of the rear end of the case 22, at locations where extra strengthening is required, as will be hereafter described.

A joining arrangement 38 is mounted to the outside of the case 22 towards the rear thereof. The arrangement 38 is in the form of a profiled metal ring 40, which is formed in a number of discrete sections as hereinafter described. The profiled ring 40 defines a radially open groove 42 profiled to receive a V-Blade on the reverser thrust unit 24, to provide a joint therebetween. In this instance the joining arrangement 38 is made from titanium, and is mounted to the body 32 by a plurality of rivets 44.

In this example the profiled ring 40 is formed of two discrete lengths, which define a gap 46 (FIG. 5) at top dead centre of the fan case 22, which gap 46 extends for 18°. A small gap 48 (FIG. 6), which extends over 8° is provided at the bottom dead centre of the fan case 22.

Figure 7:
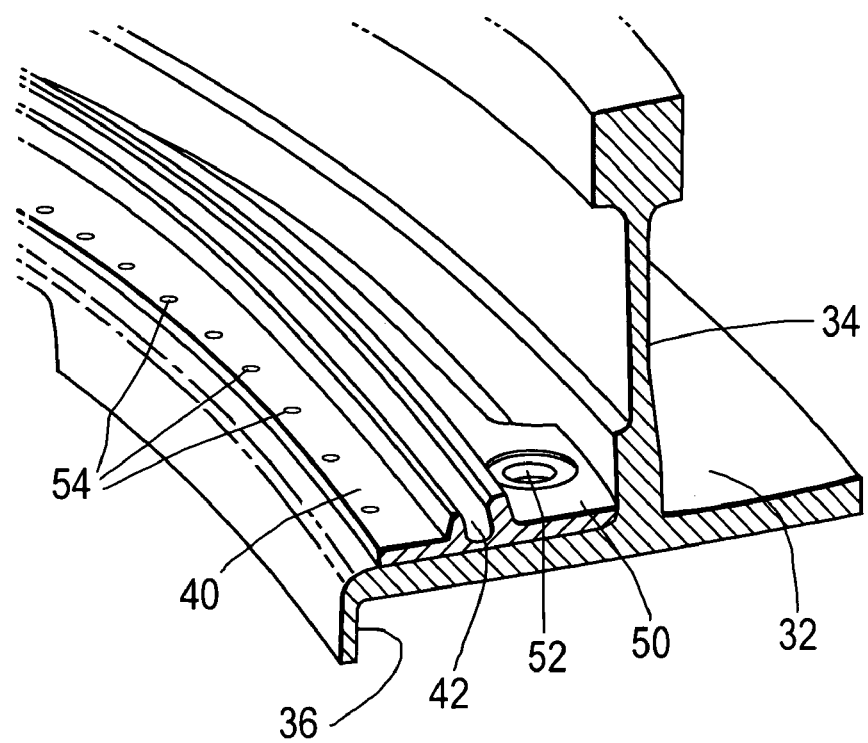
FIG. 7 is a diagrammatic perspective sectional view through a further part of the fan case of FIG. 4.

FIG. 7 shows a web 50 on the ring 40, which web 50 extends forwards and has a mounting hole 52 therein. A web 50 is provided on each side of the ring 40 at substantially 90° relative to top dead centre to permit attachment of the rear fan case 22 to the engine A-frame. The hole 52 aligns with a corresponding hole in the case body 32, which ensures correct mounting of the parts of the ring 40 on the body 32. A plurality of small holes 54 are provided to receive the rivets 44 and the small holes 54 are alignable with corresponding holes in the body 32, thereby again ensuring correct location and alignment of the parts of the ring 40 on the body 32.

The upper gap 46 corresponds to the location of the pylon and hinge mounting of the two parts of the reverser thrust unit 24. The lower gap 48 corresponds to the bifurcation disconnect panel. As can be seen the strengthening flange 36 on the body 32 is provided at each side of the gaps 46 and 48 and also adjacent to the web 50 and extending a short distance therefrom.

Figure 8:
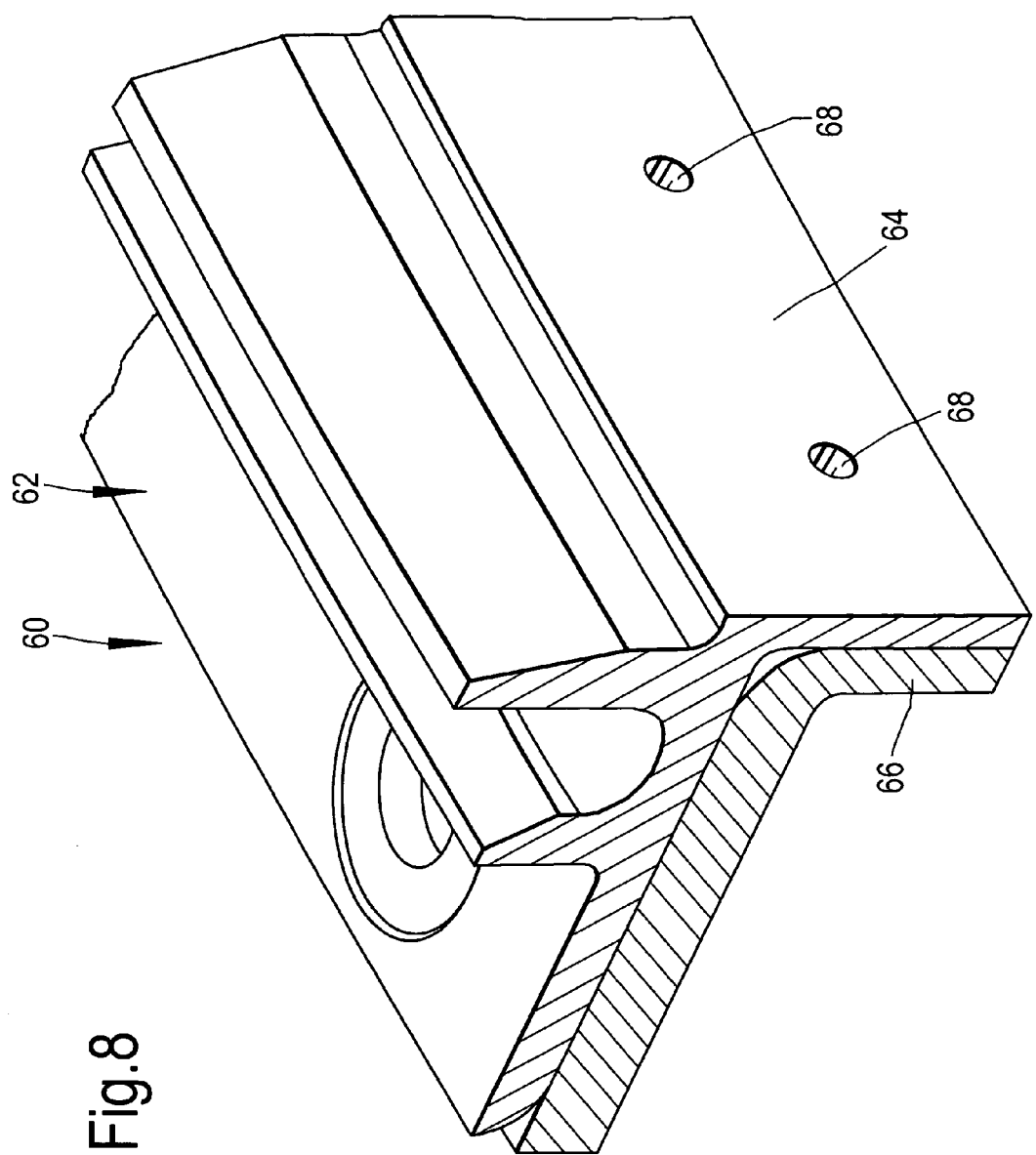
FIG. 8 is a diagrammatic perspective sectional view through part of a second rear fan case according to the invention.

FIG. 8 shows part of a second fan case 60. The fan case 60 is similar to the fan case 22 in most respects, and therefore only the differences in the fan case 60 will now be described.

In this example, the profiled ring 62 of the joining arrangement includes an inwardly turned flange 64 which overlies the flange 66 on the rear end of the case 60. In this instance the flange 66 extends around the whole of the ring 62 except for the gaps at the top dead centre and bottom dead centre. The profiled ring 62 is mounted on the case 60 by a plurality of holes 68 through the flange 66 which permit mounting of the rings 62 on the case 60, with rivets (not shown) extending through the holes 68 into corresponding holes in the case flange 66. The alignment of the holes in the flanges 64 and 66 provides for a correct alignment of the ring 62 on the case 60. This arrangement may also allow for a reduced length of the rear fan case 60.

There are thus described rear fan cases, and also a gas turbine engine incorporating such a case, which provide for a number of advantages. For instance there is a reduction in weight over conventional designs, in that metal is only used for the joining arrangement, whilst the body can be made of a lighter material such as carbon composite. Such composite material would not be suitable for use in the joining arrangement, in view of the stresses encountered thereby from the blade on the reverser thrust unit.

The feature of the ring of the joining arrangement not extending wholly around the case also provides a weight saving. The feature of the joint arrangement not extending at the top and bottom dead centres, means that more straightforward sealing can be provided at these locations. Furthermore, and particularly at the top dead centre, bracketry can be mounted to the rear part of the case rather than having to be mounted to the stiffening ring.

The parts of the joining arrangement can readily be replaced if damaged, which is a possible occurrence in use, and particularly if the blade is not properly located therein. Furthermore, in this instance in the event of damage it is not necessary to replace the whole of the case. The case can be relatively easily manufactured and assembled, and it is a relatively straightforward operation to provide extra material in the ring at specific locations such as the webs for attaching to the A-frame, as described. The location of holes in the ring mean that it is difficult to incorrectly position or align the ring.

Various modifications may be made without departing from the scope of the invention. For instance, the ring could be provided in a larger number of separate pieces, for example four pieces rather than two could be used. This could aid manufacturing and/or replacement costs. As the forces encountered in the groove of the ring are not constant around the ring, the ring could be formed with areas of different thicknesses, dependent on the load encountered at different areas. In certain areas in addition to the top and bottom dead centre, it may be possible to omit the ring.

I claim:

1. A rear fan case for a gas turbine engine having a thrust reverser unit with a joining blade, the case comprising:
   a main body; and
   a discrete joining arrangement mounted on the outside of the main body towards a rear end thereof, the joining arrangement providing a substantially radial groove around the main body, the groove being configured to receive the joining blade on the thrust reverser unit to form a joint between the rear fan case and the thrust reverser unit,
   wherein the joining arrangement is configured such that the groove does not extend wholly continuously around the main body.

2. The rear fan case according to claim 1, wherein the joining arrangement is configured such that the groove does not extend around an upper part of the body.

3. The rear fan case according to claim 1, wherein the joining arrangement is configured such that the groove does not extend over a lower part of the body.

4. The rear fan case according to claim 1, wherein the joining arrangement is formed of two or more discrete sections.

5. The rear fan case according to claim 4, wherein further mounting formations are provided on some or all of the sections of the jointing arrangement, the further mounting formations being alignable with corresponding formations on additional components, to ensure correct mounting of the jointing arrangement.

6. The rear fan case according to claim 1, wherein mounting formations are provided on some or all of the sections of the joining arrangement, with the mounting formations alignable with corresponding formations on the main body.

7. The rear fan case according to claim 1, wherein the body is made of a composite material.

8. The rear fan case according to claim 7, wherein the body is made of a carbon composite.

9. The rear fan case according to claim 1, wherein the joining arrangement is made of metal.

10. The gas turbine engine, wherein the engine includes a rear fan case according to claim 1.

11. A rear fan case for a gas turbine engine having a thrust reverser unit with a joining blade, the case comprising:
    a main body; and
    a discrete joining arrangement mounted on the outside of the main body towards a rear end thereof, the joining arrangement providing a substantially radial groove around the main body, the groove being configured to receive the joining blade on the thrust reverser unit to form a joint between the rear fan case and the thrust reverser unit, wherein the joining arrangement is configured such that the groove does not extend wholly continuously around the main body and does not extend around an upper part of the main body, and a gap is provided in the groove at the upper part of the main body extending between 15° and 25°.

12. A rear fan case for a gas turbine engine having a thrust reverser unit with a joining blade, the case comprising:

a main body; and a discrete joining arrangement mounted on the outside of the main body towards a rear end thereof, the joining arrangement providing a substantially radial groove around the main body, the groove being configured to receive the joining blade on the thrust reverser unit to form a joint between the rear fan case and the thrust reverser unit, wherein the joining arrangement is configured such that the groove does not extend wholly continuously around the main body and does not extend over a lower part of the body, and a gap is provided in the groove at the lower part of the body extending between 5° and 15°.

\* \* \* \* \*